(12) United States Patent
Bock (10) Patent No.: US 7,795,565 B2
(45) Date of Patent: Sep. 14, 2010

(54) GUIDANCE SYSTEM WITH VARYING ERROR CORRECTION GAIN

(75) Inventor: Gregory F. Bock, Feasterville Trevose, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 68 days.

(21) Appl. No.: 11/968,705

(22) Filed: Jan. 3, 2008

(65) Prior Publication Data
US 2009/0173820 A1 Jul. 9, 2009

(51) Int. Cl.
F41G 7/22 (2006.01)
F42B 15/01 (2006.01)
F41G 7/00 (2006.01)
F42B 15/00 (2006.01)

(52) U.S. Cl. ............... 244/3.15; 244/3.1; 89/1.11; 102/382; 102/384; 102/473; 102/501

(58) Field of Classification Search ........... 244/3.1–3.3; 89/1.11; 342/61–67, 165, 173–175, 195; 701/1, 23, 27; 102/382, 384, 473, 501
See application file for complete search history.

(56) References Cited

U.S. PATENT DOCUMENTS

| | | | | |
|---|---|---|---|---|
| 3,140,482 A | * | 7/1964 | Duncan et al. ............... 342/61 |
| 3,737,122 A | * | 6/1973 | Solov et al. ................ 244/3.21 |
| 3,740,002 A | * | 6/1973 | Schaefer .................... 244/3.19 |
| 3,749,333 A | * | 7/1973 | Lykken et al. .............. 244/3.15 |
| 3,760,755 A | * | 9/1973 | Licata ....................... 244/3.15 |
| 3,843,076 A | * | 10/1974 | King et al. ................. 244/3.16 |
| 3,860,199 A | * | 1/1975 | Dunne ....................... 244/3.13 |
| 3,891,166 A | * | 6/1975 | May .......................... 244/3.22 |
| 3,902,684 A | * | 9/1975 | Queeney .................... 244/3.14 |
| 3,905,563 A | * | 9/1975 | Nagoshi .................... 244/3.15 |
| 3,951,358 A | * | 4/1976 | DeLano et al. ............. 244/3.15 |
| 3,990,657 A | * | 11/1976 | Schott ....................... 244/3.15 |
| 4,008,869 A | * | 2/1977 | Weiss ........................ 244/3.13 |
| 4,034,936 A | * | 7/1977 | Eriksson et al. ............ 244/3.15 |
| 4,220,296 A | * | 9/1980 | Hesse ........................ 244/3.14 |
| 4,256,275 A | * | 3/1981 | Flick et al. ................ 244/3.19 |
| 4,350,983 A | * | 9/1982 | Blaha et al. ................ 244/3.19 |
| 4,529,151 A | * | 7/1985 | Skarman .................... 244/3.15 |
| 4,699,332 A | * | 10/1987 | Bigot et al. ................ 244/3.11 |
| 4,773,754 A | * | 9/1988 | Eisele ....................... 244/3.16 |

(Continued)

OTHER PUBLICATIONS

Mustafa Resa Becan, "Fuzzy Guidance in the Aerodynamic Homing Missiles", Proceedings of the International Conference on Computational Intelligence, 2400, pp. 266-269.

*Primary Examiner*—Bernarr E Gregory
(74) *Attorney, Agent, or Firm*—Duane Morris LLP (57) ABSTRACT

A guided missile or projectile and associated guidance control are provided to control a path to a point of intersection with a potentially moving target. A new path is repetitively recomputed and acceleration orthogonal to the path is applied to minimize heading error and thereby to converge on the target. The gain of the control function is partly proportional to heading error, but the gain is reduced approaching the point of convergence. In this way, the guidance control is more responsive to actual variance of the true heading error and is less responsive to random error in sensing the target heading, which random error would otherwise increase in its contribution to corrective guidance movements approaching the point of intersection.

14 Claims, 4 Drawing Sheets

U.S. PATENT DOCUMENTS

| | | | | |
|---|---|---|---|---|
| 5,436,832 A | * | 7/1995 | Bessacini et al. | 244/3.13 |
| 5,660,355 A | * | 8/1997 | Waymeyer | 244/3.15 |
| 5,671,138 A | * | 9/1997 | Bessacini et al. | 244/3.15 |
| 5,671,139 A | * | 9/1997 | Bessacini et al. | 244/3.15 |
| 5,671,140 A | * | 9/1997 | Bessacini et al. | 244/3.15 |
| 5,799,899 A | * | 9/1998 | Wells et al. | 244/3.11 |
| 5,944,762 A | * | 8/1999 | Bessacini et al. | 244/3.15 |
| 6,978,965 B1 | * | 12/2005 | Hartmann et al. | 244/3.16 |

* cited by examiner

GUIDANCE SYSTEM WITH VARYING ERROR CORRECTION GAIN

GOVERNMENTAL INTEREST

This invention was made with government support under Contract/Grant Aegis N00024-03-C-5115. The United States Government has a non-exclusive, non-transferable, paid-up license in this invention.

BACKGROUND

1. Field

The invention relates to the field of guidance control systems, providing a method and apparatus for dynamically guiding a controlled item such as a guided missile or guided projectile, toward intersection with the target at a location such as a point along a potentially changing trajectory of the target.

2. Related Art

Various guidance systems are possible for directing a guided missile, projectile or other moving item toward a destination by use of corrective lateral acceleration. In a case where the destination is a stationary point, there may be uncertainty in fixing the location of the target, which advantageously is decreased as the missile or projectile approaches the target. The trajectory of the guided item may be influenced by external factors, requiring guidance corrections. Where the destination is a predicted point of intersection with the trajectory of a moving object, the trajectory of the object may change as well, requiring guidance corrections.

A guidance system typically is coupled to sensing inputs from which up-to-date data is obtained in one way or another regarding the location and motion of the target. The guidance system is configured to control variable output devices for establishing an appropriate trajectory of the guided item to intersect with the target. A controller determines the amplitude of acceleration to be applied by the output devices to achieve the desired result. For example, a proportional control may apply lateral acceleration as a function of the error between the predicted positions of the guided missile and the target at a distance ahead and at a future point in time. In a weapons system, for example, the desired result may be the intersection of the trajectories of the guided item, such as a guided missile, with an independently guided target such as an aircraft. A self-propelled guided missile is used as an example in this description. It should be appreciated that the missile could be an artillery round or an object falling from an aircraft.

A guidance controller determines the acceleration to be applied by the output devices using a guidance scheme or guidance law, for example embodied in the programming of a processor or other circuitry associated with the controller. An advantageous guidance scheme is to apply acceleration in an amount that is related, according to the guidance law, to the error between the current trajectory and the trajectory that will cause the desired result, such as intersection of the trajectory of the missile with the trajectory of the target at the earliest possible time.

As a non-limiting example, a two dimensional guidance rule might predict a point of intersection from the progress of a line of sight to the target versus continuation of the missile along its current heading. In another example, a range to the target may be known such that plotting the trajectory of the missile and that of the target can be done in three dimensional space. Whether calculated in two dimensions or three, guidance corrections to the trajectory of the missile may be advantageous, such as lateral acceleration impulses in a direction that is perpendicular to the velocity vector of the missile or perpendicular to a line of sight toward one or more of the target and the predicted point of intersection. The missile is steered.

An error between the current missile trajectory versus a desired missile trajectory to intersect with the target, is identified when the bearing to the target differs from the expected bearing to the target, leading to a conclusion that the expected bearing to the point of intersection is not accurate. The guidance law re-computes the point of intersection and applies lateral acceleration to alter the trajectory of the missile, e.g., in a direction perpendicular to a line of sight from the missile to the expected new point of intersection. Lateral acceleration for a time adjusts the missile velocity vector toward crossing the target trajectory at the new point of intersection.

Different sorts of targets might be stationary, or on a fixed velocity vector, or actively accelerating, decelerating and/or steered laterally in one direction or another (in this context, "lateral" encompasses up, down, left or right). The trajectory of the target and/or the guided item may be affected by outside influences such as windage, gravitational acceleration on a parabolic path or similar factors. In any case, the controller estimates the target trajectory and guides the missile trajectory to intersect the target.

Mathematical guidance laws have been developed to operate on inputs that contain knowledge of the states of the missile and the target. The success of a guidance law turns on the accuracy of knowledge of the states of the missile and the target. There is some inherent error or tolerance in the accuracy of such knowledge, for example, the relative bearing of the target, or its range or velocity vector, or the like. There also is some inherent error or tolerance in the guidance control outputs.

In a typical guidance system, inherent input and output errors are taken in stride. Thus, the mathematics of the guidance law are designed and optimized to achieve their best results if the input data is accurate respecting the missile and target states. The guidance law will produce erroneous control accelerations if the input data is not accurate.

As a general automatic control technique, it is known to smooth variations in input data in an effort to counteract noisy or poor input data. This reduces the responsiveness of the control. Another technique could be to reject input values that are out of an expected range, e.g., differing by too large a threshold from the values of the next previous values. If a large threshold is chosen, input errors can be introduced. If the threshold is small, valid input data might be discarded. There is little practical alternative other than to rely on the input data that is available.

Absolute input accuracy cannot be expected in the practical world. Some error in defining the missile and target states will be encountered and will affect the accuracy and success of the guidance law. The effect of an input error is that the guidance law seeks to adjust the missile flight path to intersect an erroneously predicted intercept point along the trajectory of the target. It would be advantageous if techniques could be employed to reduce adverse effects of input error.

If one assumes a guidance situation involving a constant target speed and target heading, as well as accurate input information and precise output control, a guided missile beginning on an arbitrary heading might be expected to require smaller and smaller lateral accelerations to make course corrections as the missile homes in more and more accurately on the correct point at which the missile trajectory will intersect the target trajectory. On the other hand, the target may change speed or heading, or the trajectory of the missile may be affected by external influences. If so, corrections are necessary. Moreover, as the missile nears the target and nears the point of intersection, a given lateral displacement distance perpendicular to a line of sight from the missile to the intersection point subtends an angular displacement that becomes greater than the same lateral displacement did from farther away, due to parallax.

Assuming that input errors may arise, for example due to random noise in assessing the current target heading, the guidance law responds nominally by applying acceleration in a direction perpendicular to a line of sight to the point of intersection, to alter the trajectory. Noise may cause the guidance control to alter the trajectory in a given direction away from an accurate heading leading toward target interception. Assuming that the error was momentary, subsequent control iterations mitigate the error as the guidance control alters the trajectory back in the other direction to more nearly accurate. Assuming that errors continue to arise randomly, the result can be unnecessary steering movements. In a proportionate line-of-sight control based on angular heading error, the amplitude of corrective steering accelerations and subsequent corrections may increase nearing the target. Unnecessary steering movements reduce the speed of the missile and detract from the mission.

It would be advantageous to provide a technique whereby a guidance system might distinguish between input data that is affected by noise and input data that is accurate, without discarding potentially valid input data. However, a variance in an input value due to noise may be difficult to distinguish from an effect to which the guidance system should respond, such as evasive movements of an independently guided target.

Missile guidance engineers have sought to mitigate adverse effects of noise leading to erroneous input values in various ways. One technique is to limit the frequency of missile guidance updates, which is a way to smooth the guidance data input. As discussed, this reduces the responsiveness of the guidance system to changes in input conditions such as evasive movements of the target.

Fuzzy logic techniques have been applied to the problem as disclosed in "Fuzzy Guidance in the Aerodynamic Homing Missiles," Becan, Proceedings of the International Conference on Computational Intelligence, 2004, PP. 266-269. Fuzzy logic controls generally reduce the incidence of wide control swings by imposing rules, but in so doing also reduce the potential responsiveness of a control.

Another known technique is to designate a series of way points as intermediate destinations to intersect while approaching the target, rather than to re-compute the next destination at the same frequency as new and possibly noise-affected input data points become available to define the current target location, which would lead to frequent course corrections. This technique also renders the guidance system less accurate and responsive to the target, because the next previously computed way point may not be an optimal way point in view of changed conditions. The target may have deviated from its speed or heading since the way points were computed.

What is needed is a way to distinguish valid course correction needs so as to ignore, or at least damp, the response to erroneous input data that would lead to unnecessary or counter-productive course corrections. At the same time, the control scheme needs to maintain a sensitive and highly responsive reaction to valid course corrections to achieve intersection with the target trajectory as quickly and directly as possible.

SUMMARY

It is an object of the present disclosure to provide a guidance system and guidance control law that responds robustly to valid heading errors and less robustly or not at all to invalid heading errors that are the result of noisy or inaccurate input data. The guidance law re-computes guidance data according to some schedule, e.g., at each successive update of input values defining the current bearing of the target. The guidance law determines an output value that determines at least the direction (and preferably both the direction and amplitude) of lateral acceleration that will redirect the missile or other guided vehicle toward a state in which the missile will intersect the recomputed trajectory of the target.

A further object is to cause the guidance law to operate in manner that compensates for detected heading error that is dominated or affected by random input error, as opposed to true heading bias that must be removed.

The disclosed controller and control method repetitively predict the trajectory of the target, plot an intersecting missile trajectory to a point of intersection, and apply acceleration as necessary, in a direction perpendicular to a line of sight from the missile to the point of intersection. The amount of acceleration can be related to the extent of error by a proportional or other function, for example damped to minimize overshoot. The acceleration can be applied using controlled outputs such as devices for redirecting thrust, movable aerodynamic control surfaces or other steering arrangements, lateral acceleration devices such as steering thrusters.

According to an advantageous aspect, the corrective acceleration function is adjusted as interception approaches. This compensates for the increasing contribution of random noise in the assessment of heading error as point of interception approaches.

BRIEF DESCRIPTION OF THE DRAWINGS

A representative set of embodiments and arrangements are described herein as examples. It should be understood that the invention is not limited to the examples that are described in detail and is capable of embodiment in other specific ways in accordance with the appended claims. In the drawings.

DETAILED DESCRIPTION OF PREFERRED EMBODIMENTS

A novel technique for noise tolerant guidance as disclosed herein seeks to evaluate the commands that result from application of an applicable guidance law. The technique is applicable to various specific guidance laws and is discussed in the example of a feedback error control function.

Figure 1:
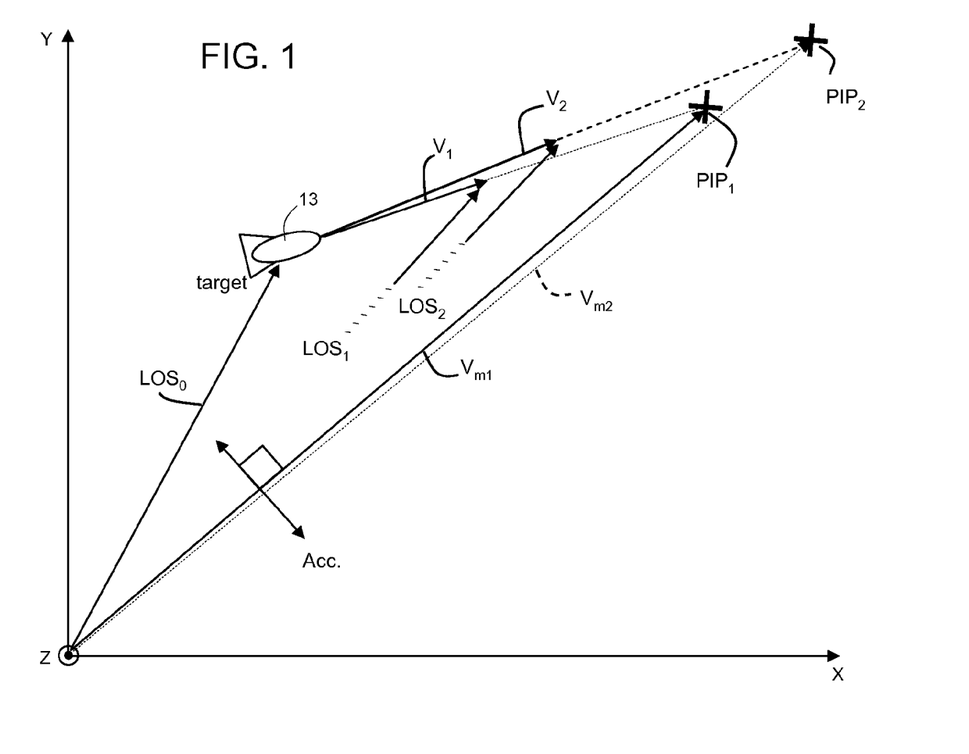
FIG. 1 is a two dimensional plot demonstrating the environment of guidance control wherein a guided missile, projectile or other item at the origin is to be controlled to intercept the trajectory of a target based on line of sight guidance.

A basic input to a guidance control system is provided by sensor data signal provided continuously or sampled successively and reported over time to a guidance controller such as a processor, identifying the present position of a target to be intercepted. In one embodiment, the position information is limited to identification of a line of sight to the target. Referring to FIG. 1, a missile or projectile is assumed to be located at the origin of the orthogonal X-Y-Z axes shown (axis Z being perpendicular to the X-Y plane). In different embodiments, the guided item might be a self propelled missile such as a rocket, or the invention could be applied to control of a projectile such as an artillery shell falling in a line or parabolic arc. For purposes of discussion, the guided item will be described in the non-limiting example of a self-propelled missile. The graphics are illustrated showing displacements in two dimensions, but operation in three dimensions (including displacement along the Z axis) also should be inferred.

An exemplary target 13 might be a moving aircraft, a vehicle, a projectile or the like. At a time to, the target is disposed along a line of sight heading $LOS_0$ and at a time $t_1$, the target has advanced along its velocity vector $V_1$ to a new line of sight heading $LOS_1$. With knowledge of the range from the missile to the target, and knowledge of the velocity vector of the missile, it would be possible to plan an interception point at which the missile trajectory and the target trajectory cross at an acute angle. However without specific knowledge of the range to the target, the missile trajectory also can be guided to converge with the target trajectory at a planned point of interception, considering missile and target bearing. Assuming that the missile is at an arbitrary heading, acceleration Acc. is applied in an amplitude and in one direction or another perpendicular to the line of sight toward the planned point of interception, so as to move the velocity vector of the missile toward a vector $V_{m1}$ and in due course to intersect the target at a planned point of interception $PIP_1$.

However, in a subsequent guidance control iteration, it may be sensed that the line of sight to the target 13 is now along line of sight $LOS_2$ and that the estimation of the planned interception point must be changed to from $PIP_1$ to $PIP_2$. Accordingly the necessary acceleration Acc is applied in direction and amplitude to move the velocity vector of the missile toward vector $V_{m2}$. As this process continues, the missile trajectory arcs more or less steeply into alignment with the trajectory of target 13. Provided that the missile speed exceeds the target speed over a necessary range, the trajectories intersect one another.

The control system repetitively posits a point of intersection with the target and compares the latest computed heading needed to reach the point of intersection against the previously computed heading. In the event of an error found between the current heading of the missile and the point of intersection as most recently computed, acceleration is applied in relationship to the extent of error and in a direction that is perpendicular to the line of sight (lateral, up or down or a combination thereof) from the missile to the point of trajectory intersection.

However in the foregoing description, there are multiple components to the repetitive heading corrections. Correction of true heading error initially concerns bringing the velocity vector of the missile into line with the required vector $V_{mn}$ to meet the point of interception. The true heading error can be expected to decrease leading up to the point of intersection.

Another component of the heading error is variance due to change in the expected and/or sensed velocity vector of the target. The variance may result from changes in the velocity vector of the target, for example because of target maneuvering. The variance also has a component of sensor error or tolerance.

Figure 2:
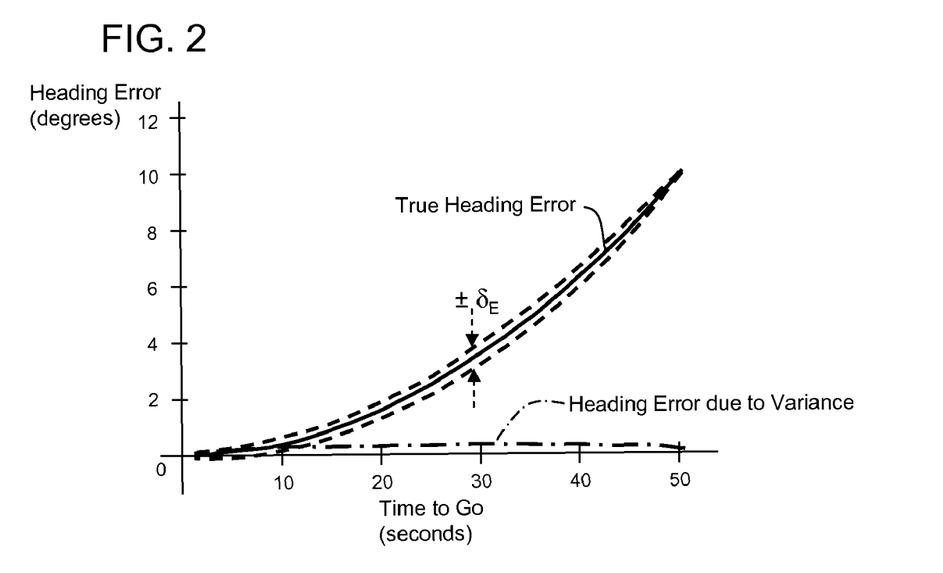
FIG. 2 is a plot of heading error versus time remaining to intercept ("time to go") showing the components that contribute to heading error, namely true heading error and typical variance.

During the trajectory leading up to the point of intersection, the variance is generally relatively constant while the true heading error is reduced, which is shown in the timing diagram of FIG. 2 (in which time progresses from right to left). When the point of interception is close, the geometry may be such that relatively larger accelerations are needed because the range to the target is less (for example, the apparent size of a given displacement distance at the target increases as the range decreases). This is demonstrated in FIG. 3.

Comparing FIG. 1 and FIG. 2, and assuming that there is a given tolerance in the sensing of the angle of the line of sight to the target, it can be seen that the true heading error, the variance due to the geometry of decreasing range, and also the variance due to sensor error (e.g., noise in the sensor signal), have different contributions in determining the acceleration Acc that must be applied by the guidance system to correct the heading of the missile as shown in FIG. 1.

According to an aspect of the present disclosure, a statistical measure and/or a computation can be used to assess the probability and/or extent that the latest computed guidance command is likely to be a response to a needed course correction (true heading error), or a response to variance in the intercept point.

Guidance laws typically are based on the proposition that the control has a valid input representing the true target state, and that there is no noise in the system. Insofar as there may be a tolerance in the accuracy with which the target heading, range and speed are assessed, a guidance system can be as accurate as the available input data defining the target state. However excessive reliance on the input data as being true can result in a system that is not optimal, especially when extending the range of interceptors.

It is appropriate as discussed herein to make adjustments to the system that account for poor quality target tracking data. Specifically, it is an object to produce guidance rules and techniques that are capable when target tracking data quality is poor (and other things being equal) to guide an interceptor farther than is possible with comparable standard guidance laws, intercepting the target more quickly, and typically intercepting the target with a higher intercept velocity than a conventional control. The solution is not simply damping or fuzzy logic, instead being a guidance scheme that takes into account aspects of target interception geometry, probability and feedback control theory.

Guidance laws are often conceived to operate accurately when input data provides perfect knowledge of missile and target states. It is unrealistic to expect perfect knowledge or absolutely accurate input data, which is of course understood. However, it is an aspect of the present disclosure that the guidance law should not respond blindly to input data, leading to control reactions based on erroneous data characterizing the missile and target states.

The extent of error in the input data from which missile and target states are determined can greatly affect the performance of a guidance law that might be very effective if the error was eliminated. Responding to erroneous data can cause the missile to adjust its flight path to home toward an erroneous predicted intercept points. Assuming that the data error is intermittent and an erroneous adjustment is made, the missile trajectory at least will be diverted from optimal to follow a longer, slower and more undulating path than is desirable. If the data error is random, the missile may proceed generally in the direction of the target, but its path can be characterized by frequent or excessive steering operations that divert the missile from the optimal path and require corrections in further steering operations.

Accordingly, a method is provided herein whereby the guidance law assesses the validity of the heading error at each update, and adjusts the guidance law to compensate for a heading error that is affected by and perhaps dominated by random error as opposed to a true heading bias or error that the guidance law can operate to remove.

FIG. 1 demonstrates how variance occurs between a previously predicted intercept point and a newly computed intercept point that is derived from the heading to the target as sensed currently. The guidance estimations and guidance law computations leading to generation of output acceleration Acc are generally based on headings or bearings. It is desirable that the missile proceed in the fastest (shortest) controlled trajectory that is available to the guidance control, from the current missile position and heading to the point of interception with the target trajectory.

It is possible to employ different specific guidance laws for calculating the bearing of the expected interception point and for determining the amplitude of the lateral acceleration Acc. However, it can be assumed that the amplitude of the lateral acceleration is at least partly proportional to the angular heading error. The determination of the heading error is based on knowledge of the current target state and possibly on additional knowledge or expectations. For example, it may be expected that a powered target will continue along its current path or that an unpowered target will descend in a parabola from its current path due to gravity, etc. To simplify the explanation, such complications need not be addressed at this point.

Assuming a proportional navigation guidance scheme, the commands during a missile's terminal homing phase can be based on the line of sight rate of the intercept point (see equation 1), and commands to accelerate are applied perpendicular to the line of sight ($\lambda$) in an amplitude.

$$N_C = -K \cdot V_M \cdot \dot{\lambda} \quad (1)$$

An equivalent relationship for acceleration commands during the missile's midcourse phase of flight is shown in equation 2. The guidance commands calculated are orthogonal to the missile velocity vector and can be expressed using the angle between the target velocity vector and the line-of-sight from the missile to the intercept point. This is defined as the heading error ($\delta$).

$$N_C = -K \cdot \frac{V_M^2}{R} \cdot (\delta) = -K \cdot \frac{V_M}{T} \cdot (\delta) \quad (2)$$

For a given intercept point, one can assume there is a variance (E) in the predicted intercept point. This variance is assumed to be perpendicular to the direction defined by the line of sight from the missile to the intercept point. As the intercept point varies from update to update due to E, the guidance law computes new acceleration commands based upon the heading error, $\delta$. This heading error $\delta$ contains components due to both true heading error, and also heading error due to variations in the target state vector. One can describe the heading error, $\delta$, in the following manner:

$$\delta = \delta_T + \delta_E \quad (3)$$

Where:

$\delta_E$ is the heading error due to variation in the predicted intercept point; and, $\delta_T$ is the true heading error.

The guidance control uses one or another of the possible algorithms to determine and more or less aggressively apply acceleration to bring the heading of the missile onto a heading along a line of sight to the point of interception. The guidance movements reduce the heading error in an error responsive feedback control arrangement. Therefore, the true heading error $\delta_T$ becomes less over time, as the missile responds to each guidance command and homes in on the intercept point. As the intercept point nears, the missile also reduces the heading error due to the variation in the predicted intercept point (possibly resulting from maneuvering accelerations by the target and possibly due to a noisy input signal characterizing the relative bearing of the target).

The two types of heading error $\delta_E$ and $\delta_T$ are inseparable contributors to the heading error $\delta$ that drives the guidance control and one cannot be sure whether one or the other is the major contributor in any particular guidance iteration. However, according to the present disclosure, the values $\delta_T$ and $\delta_E$ are recognized to be independent variables, and this fact is exploited. Equation 3 shows how the guidance acceleration command is the product of the sum of two independent variables $\delta_T$ and $\delta_E$.

$$N_C = -K \cdot \frac{V_M}{T} \cdot (\delta_T + \delta_E) \quad (3)$$

FIG. 2 is a plot illustrating the relationship of the true heading error $\delta_T$, the heading error $\delta_E$ due to track noise and the total heading error $\delta$. The total heading error includes a variance band between the dashed lines by which a variance error may positively or negatively affect the total heading error. The amplitude of the variance error $\delta_E$ is relatively more constant than the amplitude of the true heading error $\delta_T$, which purposefully is reduced toward zero as the guidance system leads the missile to the point of interception.

As shown graphically in FIG. 2, the mean value of true heading error $\delta_T$, reaches zero at T=0, namely at the point of interception. The variance value $\delta_E$ may become smaller approaching the point of interception, but as the point of interception approaches, and $\delta_T$ approaches zero, the relative contribution of the noise $\delta_E$ to the heading error $\delta$ that drives the guidance system begins to dominate (see Equation 3 above).

Figure 3:
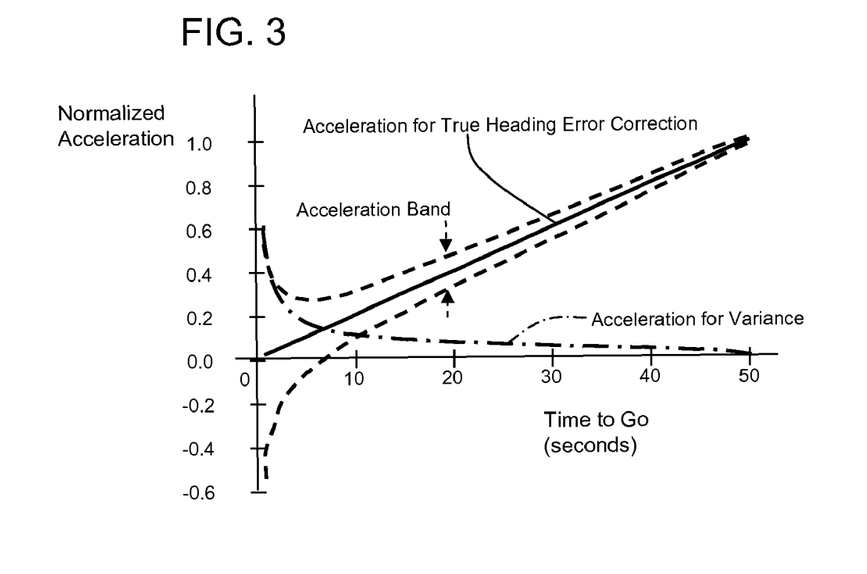
FIG. 3 is a plot demonstrating how corrective accelerations respond exponentially to variance rather than true heading error approaching the time of intercept.

If the proportional guidance scheme is directly followed up to the time of interception, the incidence of superfluous corrections in missile heading will increase as the missile approaches interception. FIG. 3 is a timing plot showing the envelope of possible accelerations that characterize operation of a proportional control when the true and variance heading errors as shown in FIG. 2 are applied to produce proportional lateral acceleration to reduce the heading error, namely as in Equation 3. In this case, the window of acceleration due to variance becomes exponential approaching interception and the geometry increases the apparent size of a given displacement near the point of interception.

Corrective accelerations may be necessary and desirable near the point of interception, including at a relatively large amplitude if needed to make a correction in a short time. Nevertheless, insofar as accelerations are made effectively to reduce $\delta_E$, those accelerations are not useful, and can operate to retard the elimination of true heading error $\delta_T$, and/or tend to slow the missile down by generating spurious guidance accelerations.

Figure 6:
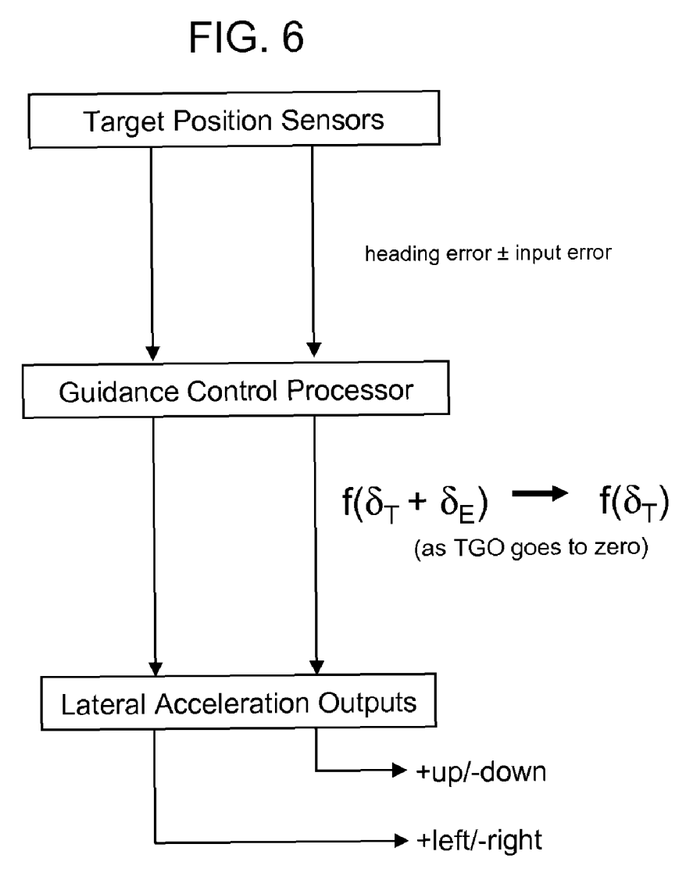
FIG. 6 is a block diagram showing the structural elements of the invention.
Figure 7:
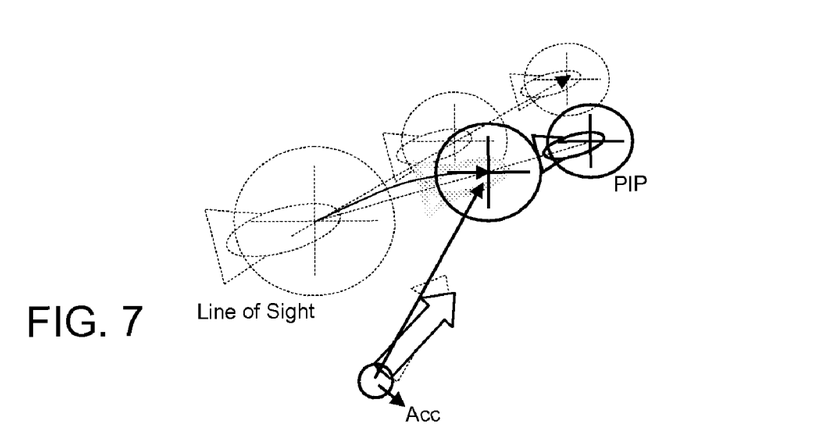
FIG. 7 is a line of sight diagram used in describing the method steps undertaken according to the invention.

An guidance control as shown in FIG. 6 in block diagram, deals with true heading error corrections and variance corrections due to changes in target state and tolerance in sensor data, schematically shown in FIG. 7. In this control arrangement, the relationship of heading errors due to variance and true heading error are distinguished by the control. According to one embodiment, the respective contributions of $\delta_T$ and $\delta_E$ to the acceleration control are assessed separately. According to another embodiment, the probability that a given total heading error $\delta$ is due substantially to the variance $\delta_E$ is assessed and used to limit the gain factor K applied to the acceleration control (Eq. 3) approaching the point of intersection.

It is not prudent to assume that a given heading error must necessarily be due to variance $\delta_E$ and not true heading error $\delta_T$ that might result, for example, from evasive acceleration of the target. However it is an aspect of the disclosure that the acceleration equation is made less responsive when one can conclude that the probability is high that a substantial part of perceived heading error is likely to be contributed by noise.

Classic proportional navigation theories may rely on a predetermined navigation gain factor value for term K in the acceleration equation (Eq. 3). For example, the navigation gain might be set to a constant value 3 for a guidance solution that seeks to minimize the total of missile acceleration squared. In a technique using trajectory shaping, maximum and minimum gain factors K1 and K2 can be imposed in an effort to optimize gain, e.g., with K1=6 and K2=2. Nevertheless, when a noise variance is introduced as shown in FIGS. 2 and 3, even a gain optimization scheme results in increased acceleration demand approaching the point at which time-to-go equals zero, i.e., the point of interception or at least the predicted interception point ("PIP"). Therefore, according to the present disclosure, a different scheme is employed to limit acceleration demand approaching the predicted interception point. This preferably is accomplished using a statistical measure as oppose to a function based on the time-to-go to the predicted interception point.

As a means to counteract the influence of $\delta_E$, the navigation gain factor K is decreased in situations where $\delta_E$ becomes statistically relevant to the total heading error, $\delta$, in order to cause the guidance control to respond to the true heading error $\delta_T$ present in the total heading error $\delta$. A statistical measure based on the time-to-go is defined to estimate the probability that a given heading error $\delta$ results entirely from $\delta_T$. The navigation factor K is adjusted according to this probability, making the acceleration less responsive approaching the predicted interception point.

According to another aspect, however, the navigation guidance gain K is kept between upper and lower limits, reaching the minimum value at a time-to-go of zero. In one embodiment a minimum limit value of $K_{min}=2$ ensures that the control is responsive to some extent to heading error even as the mean value of the heading error goes to zero at a time-to-go of zero. Preferably, an upper bound of gain K is selected as a value that would be optimal if the system had little or no noise, and the variance $\delta E$ was due to true changes in the heading of the target, due to maneuvering or other causes. In one embodiment, the maximum limit value is chosen as $K_{max}=6$.

Figure 4:
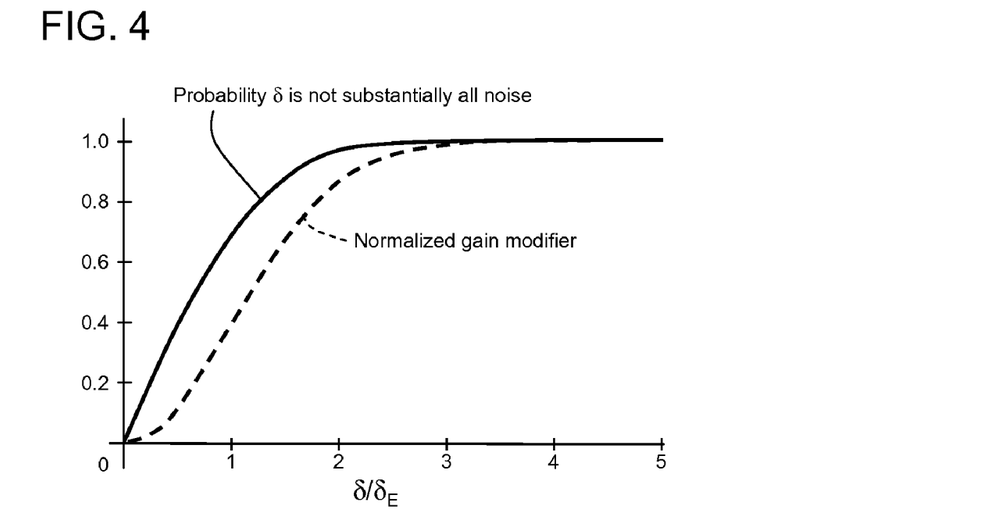
FIG. 4 is plot based on FIG. 1 showing the declining probability that an apparent heading error is due to true heading error rather than variance (especially sensor noise) approaching the time of intercept, and also showing an inventive normalized gain modifier whereby the gain of the guidance function (e.g., acceleration proportional to line of sign angular error) is reduced in a manner corresponding to the probability function.

Referring to FIG. 4, a current value of K (or K1) can be determined from a probability curve. The normalized gain modifier is used to scale the value of K from a maximum value that is optimal assuming no noise to a minimum value. This relationship is applicable to the curves of FIGS. 1 and 2, to provide for a reduced guidance gain approaching a time-to-go of zero.

For an embodiment using trajectory shaping, two gains can be employed, and according to one embodiment, two decreasing gains can be provided with one value K2 provided from a scaled value of K1. It is not strictly necessary to tune the gains together; however, an optimal relationship is possible. The optimal relationship between trajectory shaping and proportional navigation is used in Equation 4 to determine the value of K2 from the scaled value if K1 as shown.

$$K2 = \frac{1}{2}\sqrt{1+4K1} - 1)(\sqrt{1+4K1} - 3) \qquad (4)$$

For all values of K2<0, K2=0.

Figure 5:
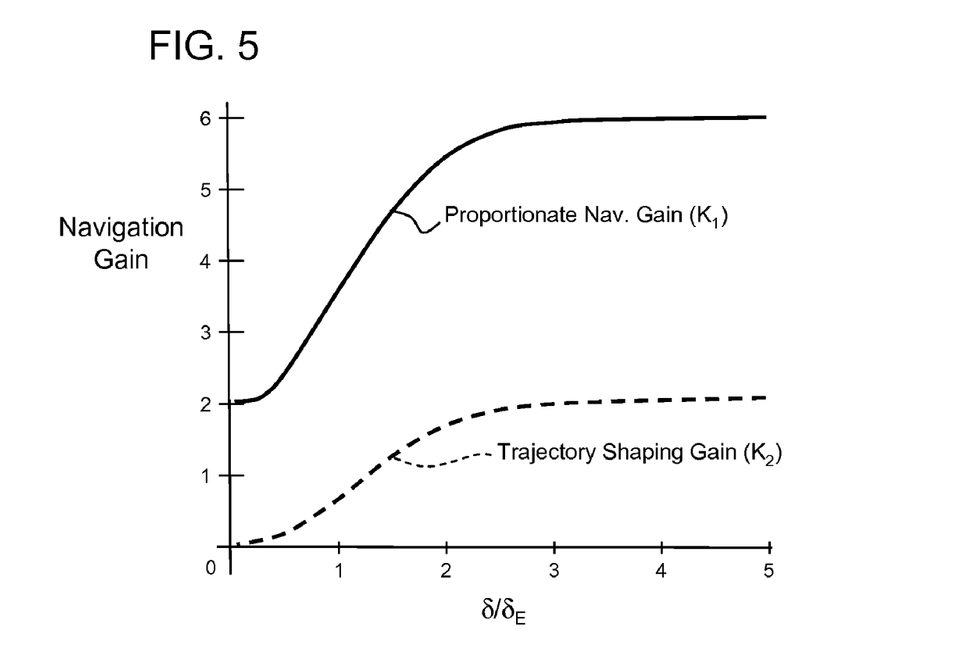
FIG. 5 is a dual plot showing that the normalized gain modifier in FIG. 4 can be subdivided into a navigation related component and a trajectory shaping component, according to respective proportions that can be varied according to factors.

FIG. 5 is a plot illustrating the provision of both a proportionate navigation gain with a maximum navigation gain of K1=6, and also a trajectory shaping gain with a maximum value of K2=2. These values are caused to decline where the probable proportion of heading error $\delta$ to variance $\delta_E$ becomes small, namely when approaching the predicted intercept point and a time-to-go of zero.

The foregoing disclosure of preferred arrangements and embodiments is intended as illustrating and not limiting the subject matter. Reference should be made to the appended claims to assess the scope of the invention in which exclusive rights are claimed.

What is claimed is:

1. A guided targeting system for converging a moving controlled item onto a projected intersection with a target, comprising:

at least one sensor for repetitively sensing at least one parameter by which target headings are defined along a line of sight to the target from the controlled item, the target headings being accurate to a tolerance error of a sensor signal;

a controller responsive to the sensor signal, wherein the controller is operable at least partly from said target headings to compute an updated location of the projected intersection with the target and a path along a line to said updated location, wherein the controller is configured to determine a heading error between a current heading of the controlled item and said path, wherein the heading error includes a sum of a guidance correction variance and said tolerance of the sensor signal; and at least one steering device for a steering force with an amplitude that is increased and decreased as a function of the heading error;

wherein the controller is configured to apply a guidance function to the steering device, the guidance function having a gain;

wherein the controller is further configured to control the gain of the guidance function, the gain of the guidance function determining how aggressively the guidance function will be applied by the controller; and wherein the gain of the guidance function is reduced by said controller upon approaching the projected intersection, whereby application of the steering force in reaction to the tolerance of the sensor signal is minimized.

2. The targeting system of claim 1, wherein the controlled item comprises a projectile and the at least one steering device comprises at least one of a movable control surface and a variably directed force.

3. The targeting system of claim 1, wherein the controlled item comprises a self propelled missile and the at least one steering device comprises at least one of a movable control surface and a variably directed propulsion force.

4. The targeting system of claim 1, wherein the controller is programmed to reduce the gain of the guidance function as a function of convergence of the current heading to said path.

5. The targeting system of claim 1, wherein the at least one parameter sensed by the at least one sensor includes range to the target, and wherein the controller is configure to reduce the gain of the guidance function with decrease in said range.

6. The targeting system of claim 1, wherein the sensor and the controller are substantially exclusively disposed on board the controlled item.

7. The targeting system of claim 1, wherein at least one of the sensor and the controller are at least partly disposed in outside of the controlled item and are operable to signal the controlled item to apply the steering force.

8. The targeting system of claim 1, wherein the gain of the guidance function is reduced upon approaching the projected intersection according to a probability that the heading error is substantially due to the tolerance error of the sensor signal.

9. The targeting system of claim 1, wherein the guidance function is based in part on proportional guidance and in part on optimizing a trajectory shape, and wherein the guidance function is shifted from proportional guidance to trajectory shaping by application of respective factors that are changed with approach to the projected intersection.

10. A guided missile comprising:
at least one sensor for repetitively sensing at least one parameter by which a target headings are defined along a line of sight from the missile to a moving target, the target headings being accurate to a tolerance error of a sensor signal produced by the sensor;
a guidance control processor responsive to the sensor signal, wherein the control processor is operable to compute from said target headings an updated location of the projected intersection with the target and a path to said updated location, wherein the control processor is configured to determine a heading error between a current heading of the controlled item and said path, wherein the heading error includes a sum of a guidance correction variance and said tolerance of the sensor signal; and
at least one steering device for applying a steering force with an amplitude that is increased and decreased as a function of the heading error;
wherein the control processor is configured to apply a guidance function to the steering device, the guidance function having a gain;
wherein the control processor is further configured to control the gain of the guidance function the gain of the guidance function determining how aggressively the guidance function will be applied by the control processor; and
wherein the gain of the guidance function is reduced by said control processor upon approaching the projected intersection, whereby application of the steering force in reaction to the tolerance of the sensor signal is minimized.

11. The guided missile according to claim 10, wherein the control processor is programmed to reduce the gain upon approaching the projected intersection according to a shift in probability that a given proportion of the heading error is contributed by the tolerance of the sensor signal versus a guidance variance.

12. The guided missile according to claim 11, wherein the control processor is configured to assess range to the projected intersection and to reduce the gain according to a decreasing value of the range.

13. The guided missile according to claim 12, wherein the control processor is configured to reduce the gain according to an exponential function of remaining range to the projected intersection.

14. The guided missile according to claim 12, wherein the control processor is configured to reduce the gain according to an exponential function of remaining time of travel to the projected intersection.

* * * * *